United States Patent
Johnson et al.

(10) Patent No.: US 9,395,016 B2
(45) Date of Patent: *Jul. 19, 2016

(54) DOUBLE ACTION DIRECTION FLUID FLOW VALVE

(71) Applicants: John Leslie Johnson, Raleigh, NC (US); James G. Johnson, Knotts Island, NC (US)

(72) Inventors: John Leslie Johnson, Raleigh, NC (US); James G. Johnson, Knotts Island, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,919

(22) Filed: Aug. 19, 2014

(65) Prior Publication Data

US 2014/0353532 A1    Dec. 4, 2014

Related U.S. Application Data

(63) Continuation of application No. 13/600,483, filed on Aug. 31, 2012, now Pat. No. 8,820,703, which is a continuation of application No. 12/205,148, filed on Sep. 5, 2008, now Pat. No. 8,256,738.

(60) Provisional application No. 60/993,649, filed on Sep. 13, 2007.

(51) Int. Cl.
| | | |
|---|---|---|
| *F16K 31/12* | (2006.01) | |
| *F16K 31/22* | (2006.01) | |
| *F16K 21/04* | (2006.01) | |
| *F16K 31/122* | (2006.01) | |

(52) U.S. Cl.
CPC ............ *F16K 31/22* (2013.01); *F16K 21/04* (2013.01); *F16K 31/122* (2013.01); *Y10T 137/8667* (2015.04)

(58) Field of Classification Search
CPC ... F16K 21/04; F16K 31/363; F16K 31/1221; F16K 31/124; F16K 31/383; F16K 31/12; F16K 39/022; F16K 39/02; F16K 27/02; F16K 11/0655; F16K 31/22; F15B 13/04; Y10T 137/8667
USPC ................. 251/12, 25, 26, 28, 282, 318, 324; 137/625.25

See application file for complete search history.

(56) References Cited

U.S. PATENT DOCUMENTS

| | | |
|---|---|---|
| 1,704,759 A | 3/1929 | Miller |
| 2,087,037 A | 7/1937 | McCarthy |
| 3,554,611 A * | 1/1971 | Kawabe et al. ............ 137/514.3 |

(Continued)

FOREIGN PATENT DOCUMENTS

| | | |
|---|---|---|
| GB | 1552987 | 9/1979 |
| JP | 52-26020 | 2/1977 |
| JP | 62-233583 | 10/1987 |

(Continued)

OTHER PUBLICATIONS

International Search Report and Written Opinion for Application No. PCT/US2008/075445 mailed on Apr. 8, 2009.

*Primary Examiner* — Steven J Ganey
(74) *Attorney, Agent, or Firm* — Carlson, Gaskey & Olds, P.C.

(57) ABSTRACT

A double action directional fluid flow valve includes a stepped piston connected with a poppet valve and moveable by a controller between open and closed positions by applying a continuous pressure to a small diameter piston face and selectively applying and removing pressure from a large diameter piston face to move the poppet valve between an open position and a closed position.

24 Claims, 20 Drawing Sheets

(56) References Cited

U.S. PATENT DOCUMENTS

| | | | |
|---|---|---|---|
| 4,231,548 A | 11/1980 | Braukmann | |
| 4,500,070 A | 2/1985 | Riollet et al. | |
| 6,328,275 B1 | 12/2001 | Yang et al. | |
| 6,435,010 B1 | 8/2002 | Johnson et al. | |
| 2007/0057214 A1 | 3/2007 | Lutz | |

FOREIGN PATENT DOCUMENTS

| | | |
|---|---|---|
| JP | 4-54304 | 5/1992 |
| JP | 11-153248 | 6/1999 |
| JP | 2002-106743 | 4/2002 |
| KR | 10-0554723 | 2/2006 |
| KR | 10-2007-0007718 | 1/2007 |

* cited by examiner

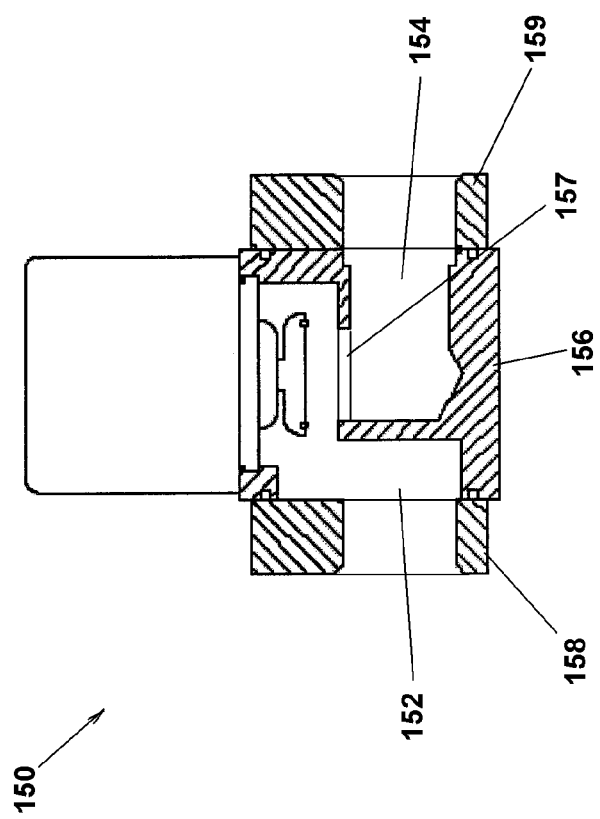

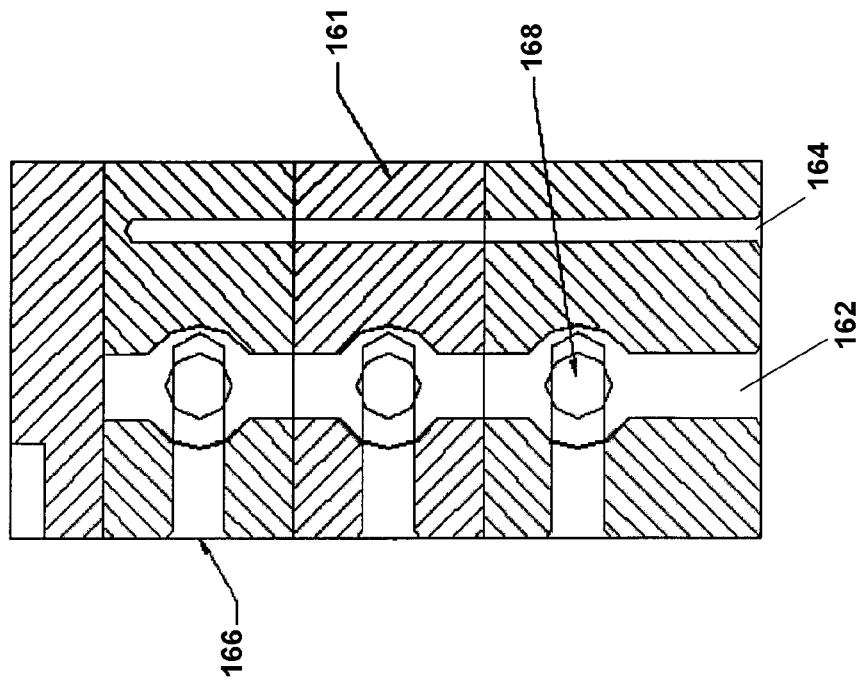
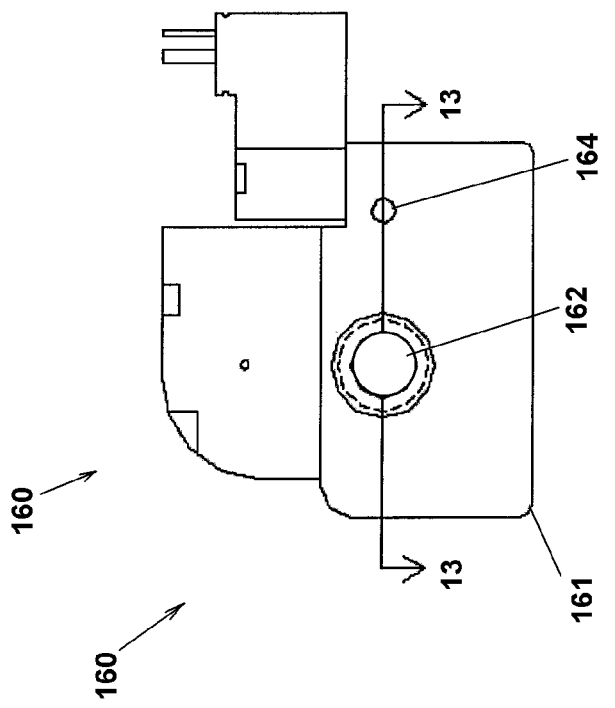
Fig. 13
Fig. 12

DOUBLE ACTION DIRECTION FLUID FLOW VALVE

RELATED APPLICATION

This application is a continuation of U.S. application Ser. No. 13/600,483 filed on Aug. 31, 2012, which is a continuation of U.S. application Ser. No. 12/205,148 filed on Sep. 5, 2008, now U.S. Pat. No. 8,256,738 granted Sep. 4, 2012, which claims the benefit of U.S. Provisional Application No. 60/993,649 filed on Sep. 13, 2007.

FIELD OF THE INVENTION

The present invention relates to direction control valves and, in particular to a fluid flow valve having affirmatively actuated pistons controlling poppet valves for the selective routing of fluids.

BACKGROUND OF THE INVENTION

Direction control valves are available in many formats for controlling the flow of fluids between sources and applications. For mere on/off control, ball and poppet valves are effective and widely employed. Where flow rates, pressure drops, and other characteristics are desired, butterfly, pressure regulating, needle control valves and other well know valve type are used. Combined with the need to handle diverse fluids, including gases, fluids, slurries of varying compositions, the number of available valves is substantial requiring dedicated tooling with little interchangeability of components.

In our pending patent application, U.S. Ser. No. 10/223,236 filed on Aug. 19, 2002, there is disclosed a flow control valve that can be manufactured in a wide range of valve sizes without dedicated tooling and requires minimal variations to handle gases and liquids at varying pressures and flow rates. Therein, a poppet valve assembly is carried in a two-piece valve body formed by conventional machining. The poppet valve assembly includes a non-spring biased piston isolated from fluid flow. The pilot actuated piston shifts a poppet valve to a closed position around a flow orifice to block fluid flow. Removing pilot pressure allows the fluid flow to shift the valve to an open position. The poppet valve accommodates flow orifices of varying sizes. Thus, by merely changing the orifice size, differing pressures and flow rates can be handled allowing a commonality of components. The valves could also be interconnected to provide multi-port functionality. Notwithstanding the increased flexibility and functionality, these poppet valves, like others, provide only on/off control at prevailing conditions in prescribed flow paths between ports. Control of vacuum applications was not possible.

It would accordingly be desirable to utilize the benefits of our above valve in applications of directional flow control not currently enabled.

SUMMARY OF THE INVENTION

The present invention provides a double action fluid flow valve controlling a poppet valve and enabling functions and features of other valve types not previously available while retaining the benefits afforded by our prior design. Fluids, under pressure and vacuum, are readily handled. Flow and flow rates may be regulated and modulated. Reverse flow may be controlled. Valve response times may be regulated to avoid line shock. Pilot pressure may be provided internally or externally. Affirmative poppet piston control may be provided in two-way, three-way or multi-way functionality. In addition, the valve may be compactly incorporated into fluidic cylinders improving response times and reducing operating costs.

In one aspect, the present invention provides a fluid flow valve including a body member having flow ports interconnected by a flow orifice surrounded by an annular planar valve seat normal to an operating axis; a stepped piston counterbore in said body member spaced from and coaxial with said valve seat, said piston counterbore having an open end and a closed end; a valve guide sealing said open end of piston counterbore and having an opening therethrough coaxial with said operating axis; a stepped piston slidably supported in said piston counterbore coaxial with said operating axis, said piston forming a first chamber between said piston and said closed end of said piston counterbore and a second chamber between said piston and said valve guide; a poppet valve member having a stem extending through said opening in said valve guide and coaxially operatively connected to said piston for concurrent movement between an open position and a closed position, said poppet valve member having an enlarged head section having a sealing surface normal to said operating axis for engaging said valve seat in said closed position at a sealing interface; and a controller for selectively pressurizing and depressurizing said second chamber while maintaining pressurizing of said first chamber thereby moving said piston and said poppet valve between said open position and said closed position. The valve functions under pressure and vacuum conditions to provide bidirectional piston actuation without springs.

In additional aspects the maintaining pressurizing of the first chamber is provided by an external pressure source and may be directly connected with said first chamber. The maintaining may also be provided by an internal pressure communicated from a passage in said body member between at least one of said ports and said first chamber. The pressurizing of said first chamber may be provided by internal pressure is communicated from passages in said body member between both of said ports and said passages include check valves whereby the highest pressure in the ports is communicated to said first chamber. A stop member in said first chamber may be axially adjustable to limit movement of said piston thereby controlling the flow between said ports in said open position.

Additionally, the fluid flow valve may include a flow control device for adjustably controlling said pressurizing and said depressurizing of said second chamber. A pressure regulator operatively associated with said controller for adjustably controlling said pressurizing of said second chamber and the pressure regulator may provide a pressure in said second chamber less than said first chamber whereby fluid flow forces between said ports modulate poppet valve position to control fluid flow therebetween.

Further, the fluid flow valve include three-way functionality and the ports may be an inlet port between said valve guide and said orifice thereof and a outlet port, an exhaust flow port in said valve body fluidly connected with said outlet port at an exhaust flow orifice surrounded by an annular planar exhaust valve seat normal to an operating axis; a cylindrical second piston counterbore in said body member spaced from and coaxial with said exhaust valve seat, said second piston counterbore having an open end and a closed end; a second valve guide sealing said open end of second piston counterbore and having an opening therethrough coaxial with said operating axis; a cylindrical second piston slidably supported in said second piston counterbore coaxial with said operating axis, said second piston forming a first chamber between said second piston and said closed end of said second piston counterbore and a lower chamber between said second piston and said second valve guide; a second poppet valve member having a stem extending through said opening in said second valve guide and coaxially operatively connected to said second piston for concurrent movement between an open position and a closed position, said second poppet valve member having an enlarged head section having a sealing surface normal to said operating axis for engaging said exhaust valve seat in said closed position at a sealing interface; and a controller for concurrently selectively pressurizing and depressurizing said second chamber of first piston while maintaining pressurizing of said first chamber and for depressurizing said first chamber of said second chamber thereby moving said pistons and associated poppet valves in phase opposition between said open positions and said closed positions.

In a further aspect, the fluid flow valve may be directly incorporated in a fluidic cylinder at each end plate member of a fluidic cylinder having a pair of spaced end plate members, a piston sleeve interconnecting the end plate members and having a piston reciprocably supported a chamber wherein said piston includes a shaft operatively extending through one of the end plate members, said piston dividing said chamber into a retraction chamber pressurized to retract said shaft into said chamber and an extension chamber pressurized to extend said shaft from said chamber, and said controller is operative with said fluid flow valve in each end plate member to pressurize said chambers in phase opposition to thereby retract and extend said shaft.

For improved isolation of the poppet piston from the fluid, first and second sealing members are carried by said valve guide and engage said valve stem, and a passage in said valve guide applies pressure between said sealing members for resisting fluid leakage from said ports to said second chamber, by example fluidly connection with said first chamber.

In yet another aspect, the invention provides a fluid flow valve includes: a body member having flow ports interconnected by a flow orifice surrounded by an annular planar valve seat normal to an operating axis; a stepped piston counterbore in said body member spaced from and coaxial with said valve seat, said piston counterbore having an open end and a closed end; a valve guide sealing said open end of piston counterbore and having an opening therethrough coaxial with said operating axis; a stepped piston slidably supported in said piston counterbore coaxial with said operating axis, said piston forming a first chamber between said piston and said closed end of said piston counterbore and a lower chamber between said piston and said valve guide; a poppet valve member having a stem extending through said opening in said valve guide and coaxially operatively connected to said piston for concurrent movement between an open position and a closed position, said poppet valve member having an enlarged head section having a sealing surface normal to said operating axis for engaging said valve seat in said closed position at a sealing interface; a first passage in said body member fluidly connected with one of said ports and a second passage in said body member fluidly connected with the other of said ports; and a controller for selectively alternatively fluidly connecting said first passage and said second passage with said first chamber.

In yet a further aspect, the present invention provides a fluid flow valve including: a body member having flow ports interconnected by a flow orifice surrounded by an annular planar valve seat normal to an operating axis; a stepped piston counterbore in said body member spaced from and coaxial with said valve seat, said piston counterbore having an open end and a closed end; a valve guide sealing said open end of piston counterbore and having an opening therethrough coaxial with said operating axis; a stepped piston slidably supported in said piston counterbore coaxial with said operating axis, said piston forming a first chamber between said piston and said closed end of said piston counterbore and a lower chamber between said piston and said valve guide; a poppet valve member having a stem extending through said opening in said valve guide and coaxially operatively connected to said piston for concurrent movement between an open position and a closed position, said poppet valve member having an enlarged head section having a sealing surface normal to said operating axis for engaging said valve seat in said closed position at a sealing interface; a first passage in said body member fluidly connected between one of said ports and said first chamber; a stop member carried by said body member axially adjustably positioned in said first chamber and having a sealing member engagable with said piston in a closed position at a sealing interface and spaced from said piston in an open position; a vent passage in said piston member and said valve guide and fluidly connecting said other of said ports and said first chamber when said sealing member of said stop member is in said open position and fluidly disconnecting said other of said ports and said first chamber when said sealing member of said stop member is in said closed position; and spring means for biasing said piston toward said closed position with said sealing member of said stop member.

In yet an additional aspect, the present invention provides a fluid flow valve including: a body member having flow ports interconnected by a flow orifice surrounded by an annular planar valve seat normal to an operating axis; a stepped piston counterbore in said body member spaced from and coaxial with said valve seat, said piston counterbore having an open end and a closed end; a valve guide sealing said open end of piston counterbore and having an opening therethrough coaxial with said operating axis; a stepped piston slidably supported in said piston counterbore coaxial with said operating axis, said piston forming a first chamber between said piston and said closed end of said piston counterbore and a lower chamber between said piston and said valve guide; a poppet valve member having a stem extending through said opening in said valve guide and coaxially operatively connected to said piston for concurrent movement between an open position and a closed position, said poppet valve member having an enlarged head section having a sealing surface normal to said operating axis for engaging said valve seat in said closed position at a sealing interface; a stop member carried by said body member axially adjustably positioned in said first chamber; a spring member between said stop member and said piston for biasing said poppet valve to said closed position; and a controller for selectively pressuring said chamber to move said poppet valve to said closed position.

BRIEF DESCRIPTION OF THE DRAWINGS

The above and other features and advantages of the invention will become apparent upon reading the following description taken in conjunction with the accompanying drawings in which:

FIG. 11 is a side cross sectional view of another embodiment of the invention;

FIG. 12 is a side elevational view of another embodiment of the invention;

FIG. 13 is a cross sectional view taken along line 13-13 of FIG. 12;

DETAILED DESCRIPTION OF THE PREFERRED EMBODIMENTS

Figure 2:
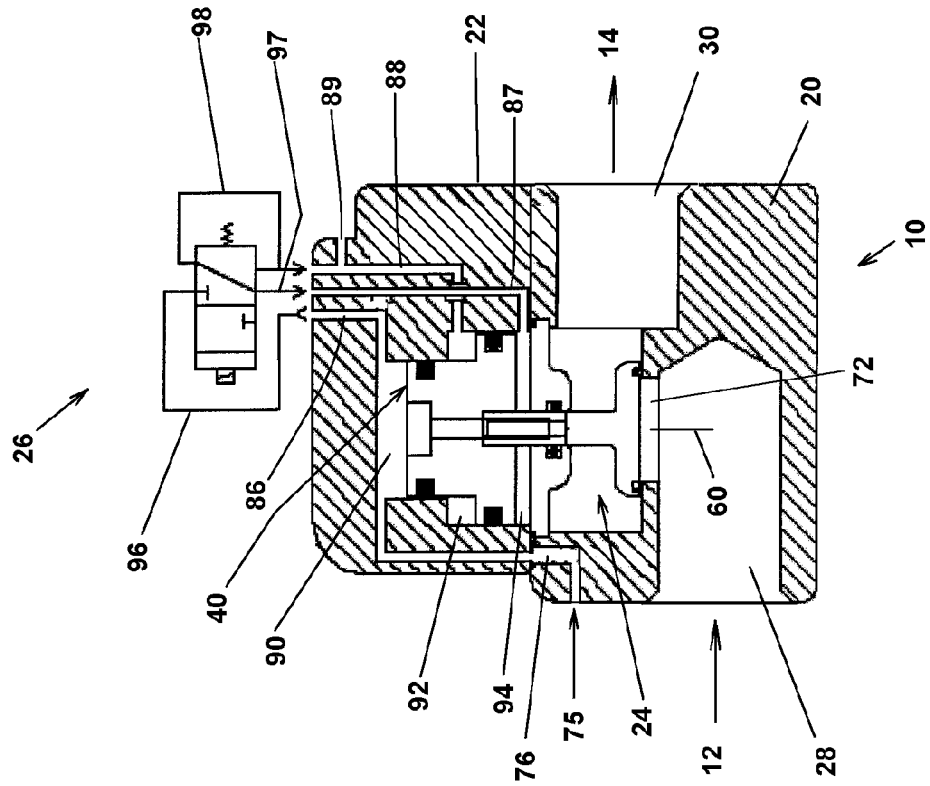
FIG. 2 is a side cross sectional view of the fluid flow valve in the closed position taken along line 2-2 in FIG. 1.
Figure 1:
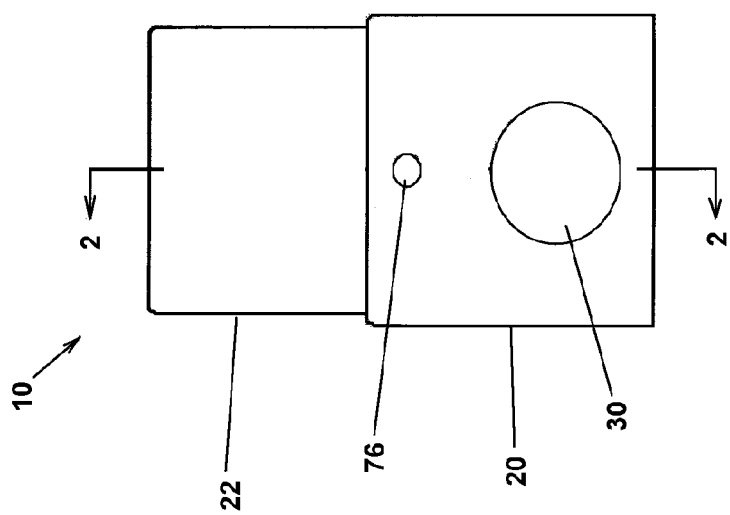
FIG. 1 is a side view of a double action directional fluid flow valve in accordance with an embodiment of the invention.
Figure 3:
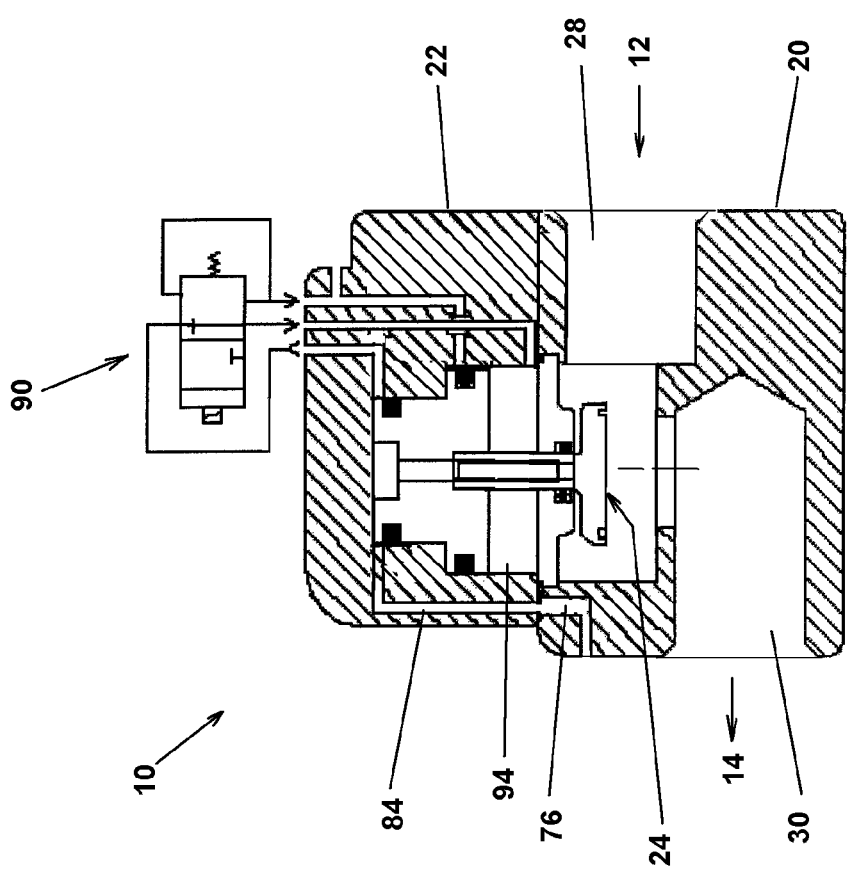
FIG. 3 is a side cross sectional view of the fluid flow valve of FIG. 2 in the open position.

Referring to the drawings and FIGS. 1 through 3, there is shown a double action directional fluid valve 10 in accordance with a preferred embodiment for controlling the flow of fluid between fluid source 12 and a fluid application 14. The valve 10 is configured in the embodiment as a two way valve, however, it will become apparent that other configurations and features may be incorporated as described in greater detail in the additional embodiments described below. It will also be apparent that the valve may be used for fluids in gaseous or liquid states and under pressure or vacuum conditions.

The fluid control valve 10 comprises a two-part body member including a base or valve body 20 and a cover or actuator body 22 operatively carrying a double piston poppet valve assembly 24 operated by a controller 26. The valve 10 functions to prevent the flow of fluid from the source 12 in the closed position of FIG. 2, and permit the flow of fluid from the source 12 between an inlet port 28 and an outlet port 30 to the application 14 in the open position of FIG. 3. The valve 10 also functions to prevent flow back through the port 30 into the port 28.

Figure 6:
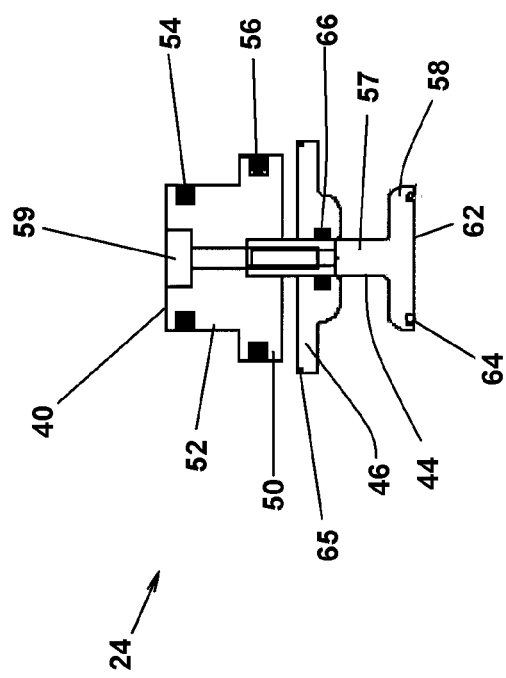
FIG. 6 is a side cross sectional view of the poppet valve assembly of the fluid flow valve of FIG. 1.

Referring to FIG. 6, the poppet valve assembly 24 comprises a stepped piston 40 connected to a poppet valve 44 that is slidably supported in assembly by a valve guide 46. The piston 40 includes a cylindrical base section 50 of a major diameter D1 and a top section 52 of a lesser minor diameter D2. The diameters of the piston 40 are relatively sized to provide a double action actuation for positive opening and closing, without supplemental springs, to control flow, the sizes being dependent on the specifics of the flow control application. The top section 52 includes an outwardly opening annular groove in an outer surface for retaining a sealing element 54, such as an O-ring. The base section 50 includes an outwardly opening annular groove in an outer surface for retaining a sealing element 56, such as an O-ring. The poppet valve 44 includes a cylindrical stem 57 and an enlarged generally cylindrical valve disc or valve member 58. The upper end of the stem 57 includes a threaded axial hole. The stem 57 is coaxially received with a press fit in a downwardly opening counterbore in the base section 50 of the piston 40. A through hole including an upper counterbore is formed in the top section 52 of the piston and intersects the lower counterbore. A threaded fastener 59 is received therein with the shank threaded to the valve stem 57 to fixedly connect the poppet valve to the piston, after assembly with the valve guide 46. The poppet valve 44 is thus coaxially connected with the piston for movement along an operational axis 60 (FIG. 2). The valve member 58 includes a planar circular lower surface 62 normal to the axis of the stem. A downwardly opening annular groove is formed in the lower surface for carrying a sealing element 64, such as an O-ring. A plurality of grooves may be provided whereby a common poppet valve may be used with appropriate sealing elements for use with varying sized orifices. The poppet valve is thus face seated and the stem and valve member are exterior of the flow orifice. A rear seated configuration may also be used.

The valve guide 46 is a circular disc having an outer flange having an outer diameter coaxial with a center bore. The flange carries on the upper surface thereof a sealing element 65 for sealing with an opposed planar bottom surface of the actuator body. The stem of the poppet valve has a close sliding fit with the center bore of the valve guide for additionally maintaining coaxial movement in assembly. The center bore includes an inwardly opening annular groove for retaining a sealing element 66, such as an O-ring, for sealing the valve stem.

Figure 5:
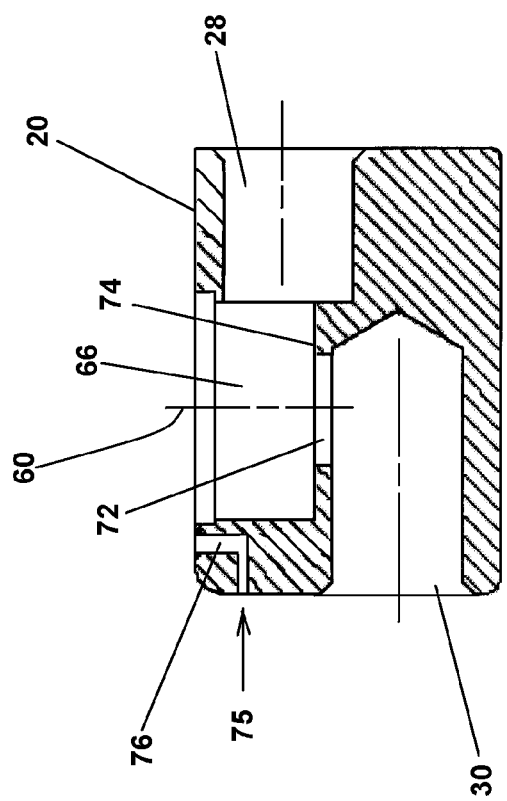
FIG. 5 is a side cross sectional view of the valve body of the fluid flow valve of FIG. 1.

Referring to FIG. 5, the valve body 20 includes an upwardly opening stepped counterbore 66. The counterbore 66 is intersected with the lateral inlet port 28 connected to the fluid source. The lateral outlet port 30 is formed below the counterbore 66. An annular flow orifice 72 is formed coaxially in the base of the counterbore 66 and serves to fluidly interconnect the ports. An annular valve seat 74 is formed in the counterbore base around the orifice 72 for providing a sealing interface with the sealing element 64 of the poppet valve 44 (FIG. 6). A pilot passage 76 is formed in the valve body having an inlet connected to a source of pilot pressure 75 and an outlet at the top surface thereof for fluid connection with a passage in the actuator body 22 as described below.

Figure 4:
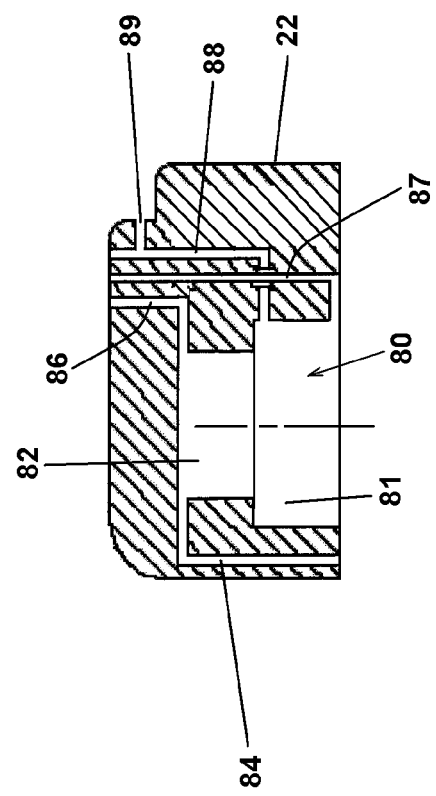
FIG. 4 is a side cross sectional view of the actuator body of the fluid flow valve of FIG. 1.

Referring to FIG. 4, the actuator body 22 includes a downwardly opening stepped counterbore 80. The actuator body 22 and valve body 20 are fixedly connected with suitable fasteners, not shown, for clamping the opposed planar surfaces together with the counterbore 80 in the actuator body coaxial with the counterbore 66 in the valve body 20. The counterbore 80 includes a base section 81 having a diameter providing a close sliding fit with the base section of the piston 40, and a top section 82 having a close sliding fit with the top section of the piston. It will thus be appreciated that, in assembly, the poppet valve is constrained at four coaxially locating surfaces; the piston interfaces, the valve guide bore, and the press fit of the valve stem with the piston. This maintains the critical perpendicular movement of the valve with respect to the valve seat to insure positive planar contact therebetween.

A pilot passage 84 in the actuator body includes a downwardly opening section registering with the pilot pressure passage in the valve body connected with a lateral section having an outlet at the base of the top section 82 of the counterbore 80. A second or upper chamber passage 86 in the actuator body includes a lateral section having an inlet at the base of the top section of the counterbore 80 connected with a vertical section having an outlet in the top surface. A third or lower chamber passage 87 in the actuator body has a lateral section intersecting the base section of the counterbore adjacent the rim thereof connected with a vertical section exiting at the top surface. A fourth or middle chamber passage 88 in the actuator body has a lateral section intersecting the base section of the counterbore adjacent the base thereof connected with a vertical section exiting at the top thereof. A fifth or vent passage 89 intersects passage 88 and provides an exhaust port to the exterior.

In assembly, the piston in the closed position of FIG. 2 establishes an upper chamber 90 between the top of the piston and the base of the upper section of counterbore, an intermediate middle chamber 92 between the piston sections and the base of the base section of the counterbore, and a lower chamber 94 between the piston and the valve guide. The upper chamber 90 is thus fluidly connected with passages 82, 84, the middle chamber 92 with passage 88, and the lower chamber 94 with passage 87.

The passages 84, 86, 88 are fluidly connected with the controller 26. A suitable controller is a three-way solenoid valve. The controller 26 is selectively operative to pressurize and exhaust the lower chamber 94 while maintaining pressure in the upper chamber 90. The normally closed input port of the controller 26 is connected by line 96 with passage 84 from the upper chamber 90. The passage from the lower chamber 94 is connected with a normally open port by line 97, the outlet of which is connected by lines 98 to the passage 88 and the vent passage 89.

In the closed position of FIG. 2, the upper chamber 90 is pressurized by the pilot pressure and the middle and lower chambers 92, 94 are vented, whereby the pressure in the upper chamber shifts the piston 40 to the lower position whereat the poppet valve 44 seals the orifice 72 preventing flow between the inlet port 28 and the outlet port 30 against the inlet pressure force at the orifice sealing interface. These conditions may be met through selection of the pilot pressure, the piston section diameters and the orifice size. The orifice size, in particular, may be selected handle a wide range of the source pressures while retaining a base construction for the actuator assembly and pilot pressure. When the controller is oppositely conditioned, both the upper and lower chamber are pressurized from the pilot source 75, with the diametral differences between the piston sections providing a net upward force shifting the poppet valve to the open, raised position of FIG. 3 allowing flow between the ports. It will be appreciated that the selective pressure conditions in the chambers may be provided by independent pressure sources of the same or differing pressure.

The foregoing fluid control valve provides a rapid response times in both directions. For closing, the exhausting of the larger lower chamber momentarily pressurizes the middle chamber resulting in an additional downward force on the middle chamber piston area thereby increasing the rate of closure. For opening, the flow to the lower chamber creates a pressure drop in the upper chamber, increasing the opening force and response time. Further, the venting is unidirectionally outward. No negative pressures in the chamber occur during actuation. This prevents entry of exterior contaminants that can foul the valve parts and allows operation under formerly unfavorable conditions.

Figure 7:
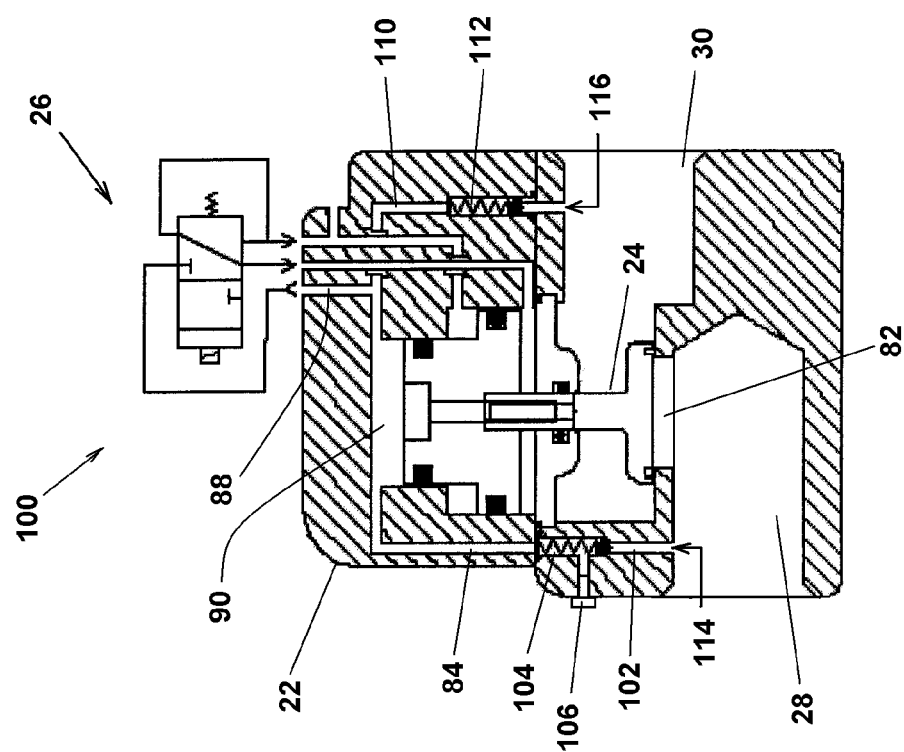
FIG. 7 is a side cross sectional view of another embodiment of the invention.

In the following embodiments, common components use their prior numerical designation. Referring to FIG. 7, the pilot pressure may be provided by the internal pressure at the ports. The flow control valve 100, as described above and using prior numerical designations for the components, may be provided with a passage 102 connecting the inlet port 28 with the passage 84 in the actuator body. The passage 102 may include a spring biased check valve 104. The passage 102 may be provided with an existing pilot connection with an exterior source, by capping the same with a plug 106. Another passage 110 including a check valve 112 is provided from the outlet port 30 wherein a passage communicates with the upper chamber 90 and the passage 88 to the controller 26. This arrangement provides a pilot pressure that is the highest of the pressures experienced steadily or transiently in either port thereby preventing back leakage regardless of port pressures. The flow direction above may be reversed.

Figure 8:
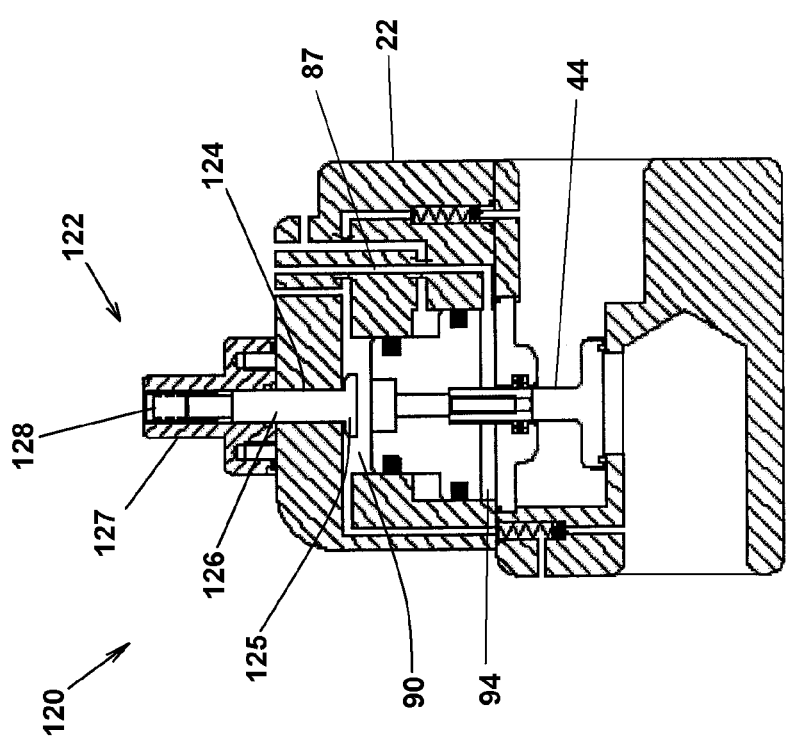
FIG. 8 is a side cross sectional view of another embodiment of the invention.

Another embodiment of the invention is shown in FIG. 8 wherein the double action directional fluid flow valve is provided with a flow control. The basic valve 120 may be the same as described above wherein the poppet valve 44 is shifted downwardly to a closed position to seat the valve under either external pilot pressure or internal pressure. The valve is reversely conditioned to the open position by applying pressure at passage to the lower chamber 94 thereby shifting the poppet valve upwardly. The valve 120 includes a flow control assembly 122 comprising a piston stop 124 having an enlarged head 125 disposed in the upper chamber 90 and a cylindrical shank 126 slidably extending through an axial hole in the base of the actuator body 22 and received in an axial bore of an adjustment bracket 127 attached to the top of the actuator body. The upper portion of the bore is threaded and receives and an adjustment screw 128. The adjustment screw may be manually adjusted to raise or lower the head 125 of the piston stop 124. Such adjustment, in turn, varies the limit of upward piston travel, and accordingly the flow through the orifice. The adjustment screw may also be coupled to an electromechanical actuator for remote control of the flow characteristics. In either case, the flow control assembly allows dynamic adjustment of the flow characteristics, enabling the valve 120 to respond similar to a mechanical ball valve in varying flow rates during operation.

Figure 9:
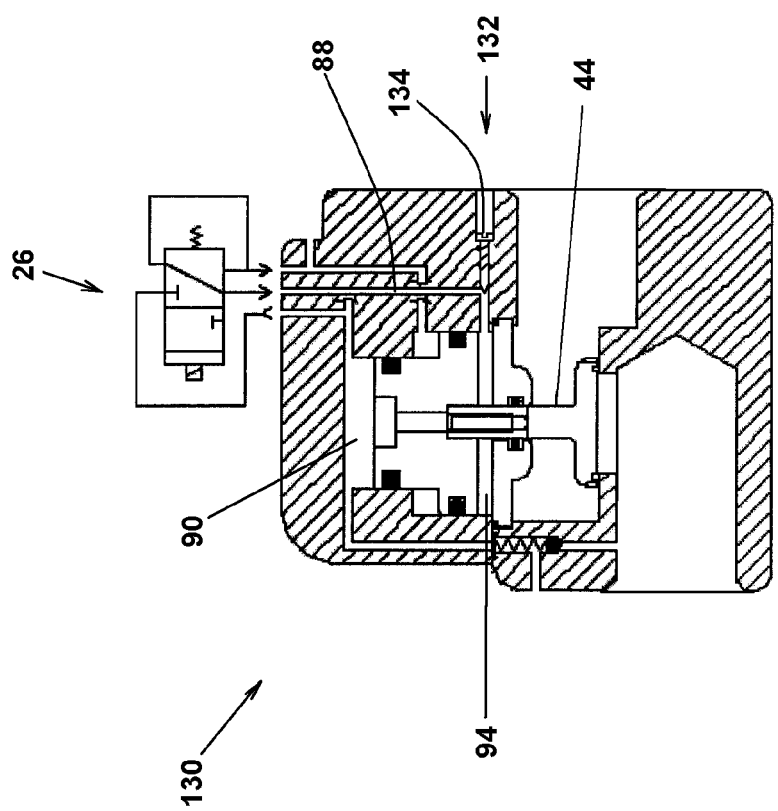
FIG. 9 is a side cross sectional view of another embodiment of the invention.

A further embodiment of the invention is shown in FIG. 9 wherein the double action directional fluid flow valve is provided with a response control. The basic valve 130 may be the same as described above wherein the poppet valve 44 is shifted downwardly to a closed position to seat the valve under either external or internal pilot pressure. The valve is reversely conditioned to the open position by applying pressure at passage to the lower chamber 94 thereby shifting the poppet valve upwardly. The valve 130 includes a flow control assembly 132 comprising a needle valve or flow control screw 134 positioned in a passage for the lower chamber 94 at the intersection of passage sections. The needle valve 134 is threaded into a lateral threaded hole and has a manually adjustable tip position effective for varying the pilot flow from the upper chamber 90 through the controller 26 to the lower chamber 94 to thereby adjustably control the opening rate of the poppet valve as the lower chamber is pressurized.

The valve 134 also serves to control the valve closing by restricting the venting of the lower piston chamber.

The response control overcomes shock and damage due to sudden pressure increases when the valve is opened or closed. Such shock or hammering effects caused by rapidly shifting valves are particularly harmful in liquid flow applications that require some type of control to protect the system. The response control may be operationally adjusted on site to the requirements of the application.

Figure 10:
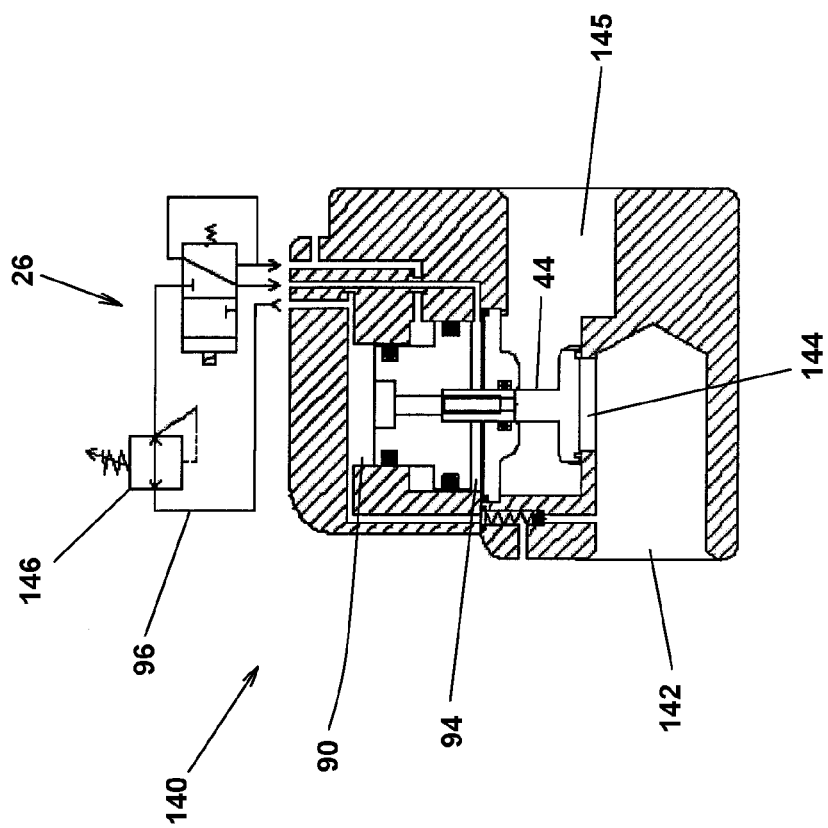
FIG. 10 is a side cross sectional view of another embodiment of the invention.

A further embodiment of the invention is shown in FIG. 10 wherein the double action directional fluid flow valve is provided with a pressure control. The basic valve 140 may be the same as described above using an external pilot pressure and wherein the inlet port 142 is below the poppet valve and orifice 144 and the outlet port 145 is thereabove. With this arrangement the line from the upper piston chamber to the controller includes a pressure regulator 146. The pressure regulator 146 may be manually or electromechanically controlled. In the closed position, the pilot pressure in the upper piston chamber 90 is selected to create a positive downward force to seat the poppet against the counter force of the inlet pressure in inlet port 142 acting against the poppet valve surface at the orifice and the valve remains closed. To open, the pressure regulator 146 is adjusted to provide a pressure to the lower chamber 94 that is less than the pressure required to open the valve on its own. In combination with the inlet port pressure, however, the opening force is greater than the force in the upper piston chamber whereby the valve moves to the open position. As the pressure differential between the inlet port and the outlet port decreases, the velocity pressure force on the poppet valve is decreased and when the upper piston chamber force overcomes the lower piston chamber force and the diminished force on the poppet valve, the later is shifted toward the closed position. This in turn regulates the down stream pressure without the use of a separate regulator in the outlet line. The arrangement allows high speed and high flow pressure control.

Referring to FIG. 11, the basic valve as described above can also be configured to have inline inlet and outlet ports, 152 and 154, respectively, in the valve body 156 wherein the flow orifice 157 is formed in a horizontal base wall of the poppet valve counterbore and communicates with the port 154. The ports 152 may be a larger diameter counterbores thereby providing an increased flow capacity comparable to conventional larger high flow inline poppet valve with costly sand cast bodies. The valve may be removed without disturbing the adjacent valve port blocks 158, 159. The port blocks can be ported with pipe threads or other convention connection methods.

The machined passages may be configured to provide further advantages. Referring to FIGS. 12 and 13, valves 160 as described above may be provided with valve bodies 161 having axially aligned, serially connected longitudinal through ports 162 and pilot ports 164 fluidly communicating with longitudinally spaced lateral ports 166 at orifices 168, which are selectively and opened and closed by the double piston poppet valve assembly as described above. This arrangement permits the valves to be directly connected without the conventional independent porting resulting in obvious size and cost advantages. Further, such an arrangement allows the fluid flow direction to be reversed. Thus fluid may flow from a common source through ports 162 for selective distribution at ports 166, or delivered from plural sources at ports 166 for common supply at ports 162.

Figure 14:
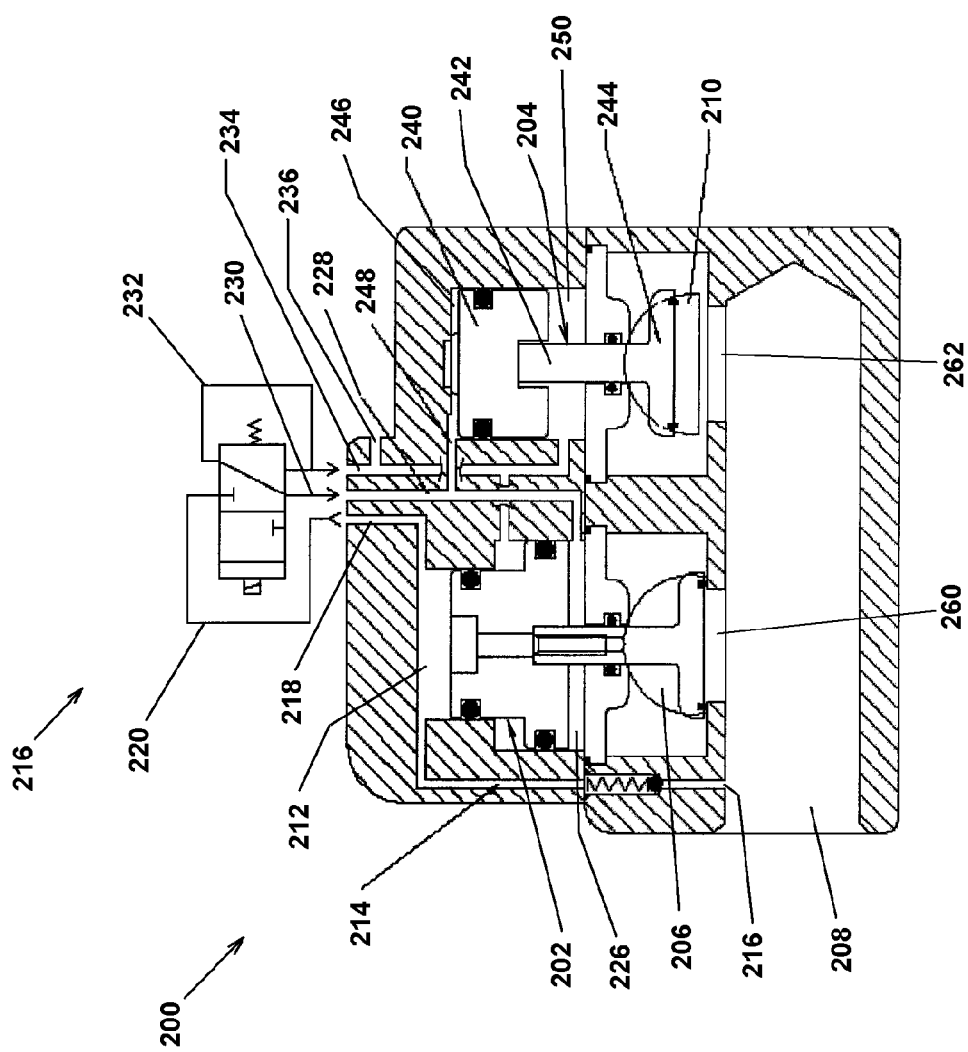
FIG. 14 is a side cross sectional view of another embodiment of the invention.

The poppet and double piston arrangement may also be beneficially incorporated with three way functionality. Referring to FIG. 14, there is shown a three way double action fluid flow valve 200. Therein, a double piston poppet valve assembly 202 is operatively coupled with a single piston poppet valve assembly 204 to provide three-way control of fluid from an inlet port 206 to an outlet port 208 controlled by valve assembly 202, and from the outlet port 208 to an exhaust port 210 controlled by valve assembly 204.

The valve assembly 202 is controlled as described above wherein a pilot pressure is maintained in the upper chamber 212 through passage 214 from a check valved internal source 216. An external source as described above may also be used. The upper chamber 212 is connected to a three way controller 216 at passage 218 and line 220. In the closed position, the lower chamber 226 is vented at passage 228, and lines 230 and 232 at the controller 216 to vent passage 234, 236. In the open position, the controller 216 is reversely conditioned and the lower chamber 226 is pressurized while maintaining pressure in the upper chamber 212 thereby raising the double piston assembly 202 to the open position and permitting fluid flow from the inlet port 206 to the outlet port 208.

The valve assembly 204 includes a single piston 240 supported in a counterbore in the actuator body that is operatively connected to a poppet valve 242 and valve guide 244. The upper chamber 246 of the valve assembly 204 is connected through passage 248 to the passage 228 from the lower chamber 226 of the double piston valve assembly 202 and accordingly is pressurized and exhausted therewith. The lower chamber 250 of the valve assembly 202 is connected to the vent passage 234 and accordingly continuously vented.

In operation, when the valve assembly 202 is conditioned open, the lower chamber 226 and the upper chamber 246 above the single piston are pressurized while maintaining pressure in the upper chamber 212, whereby the single piston is shifted to the closed position whereat the poppet valve seals the orifice 262 to the exhaust port. When the double piston is conditioned closed at the controller, the lower chamber 226 and the upper chamber 246 of the single piston are vented whereby fluid pressure from the outlet port 208 raises the poppet assembly 204 and piston to the open position enabling fluid flow from the outlet port 208 to the exhaust port 210. Thus three way functionality is provided compactly with a single control and a unitized multiple piston valve assembly.

Figure 16:
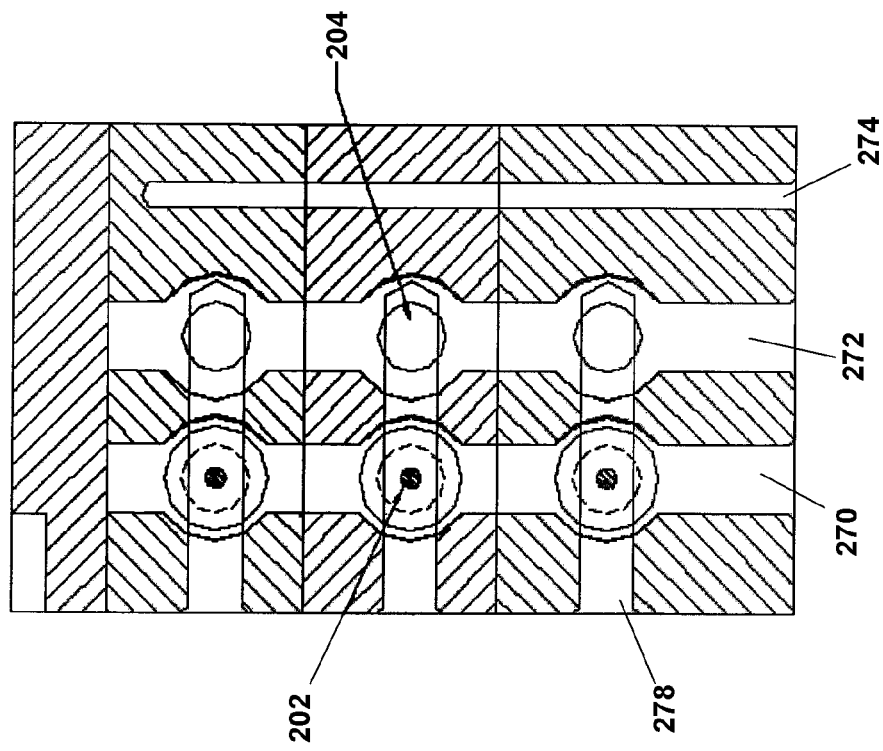
FIG. 16 is a cross sectional view taken along line 16-16 in FIG. 15.
Figure 15:
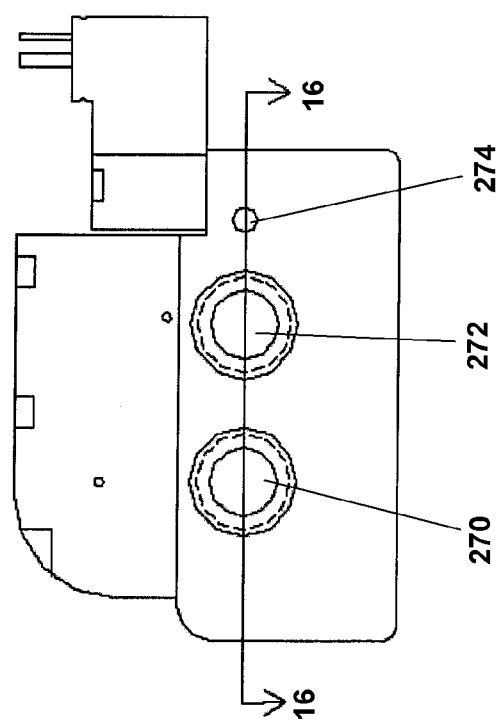
FIG. 15 is a side elevational view of the embodiment of FIG. 14.

The three way functionality may also be provided in a modular in-line format as shown in FIGS. 15 and 16 wherein the inlet ports 270 are axially aligned, the exhaust ports 272 are axially aligned, and the pilot ports 274 are axially aligned. The ports are independently connected with respective outlet ports 278 and the fluid flow thereto and therefrom controlled by the above described valve assemblies to independently control fluid flow with respect to inlet orifices and exhaust orifices.

The three way functionality of the double action fluid flow valve may also be incorporated into conventional pneumatic or hydraulic cylinders to provide energy savings, increase cylinder actuation speeds, and can be used as a redundant safety valve or as a booster valve for further increases in actuation speed. Therein the end caps of the cylinders are machined to provide the valve body with desired porting and the actuator body and poppet valve assembly assembled thereto and removed therefrom for installation, replacement and service. The above features and controls may be incorporated for operation.

Figure 17:
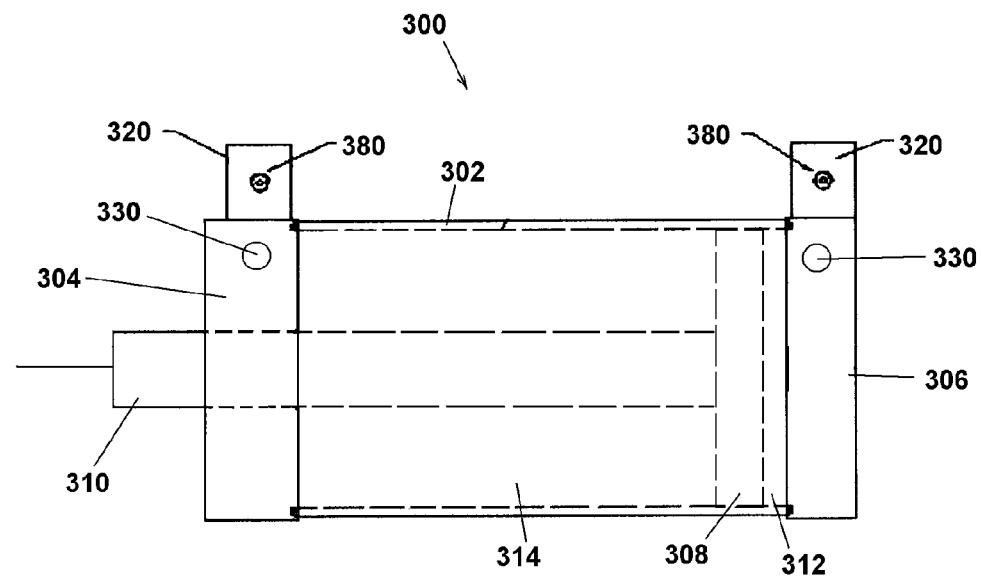
FIG. 17 is a side elevational view of another embodiment of the invention.
Figure 18:
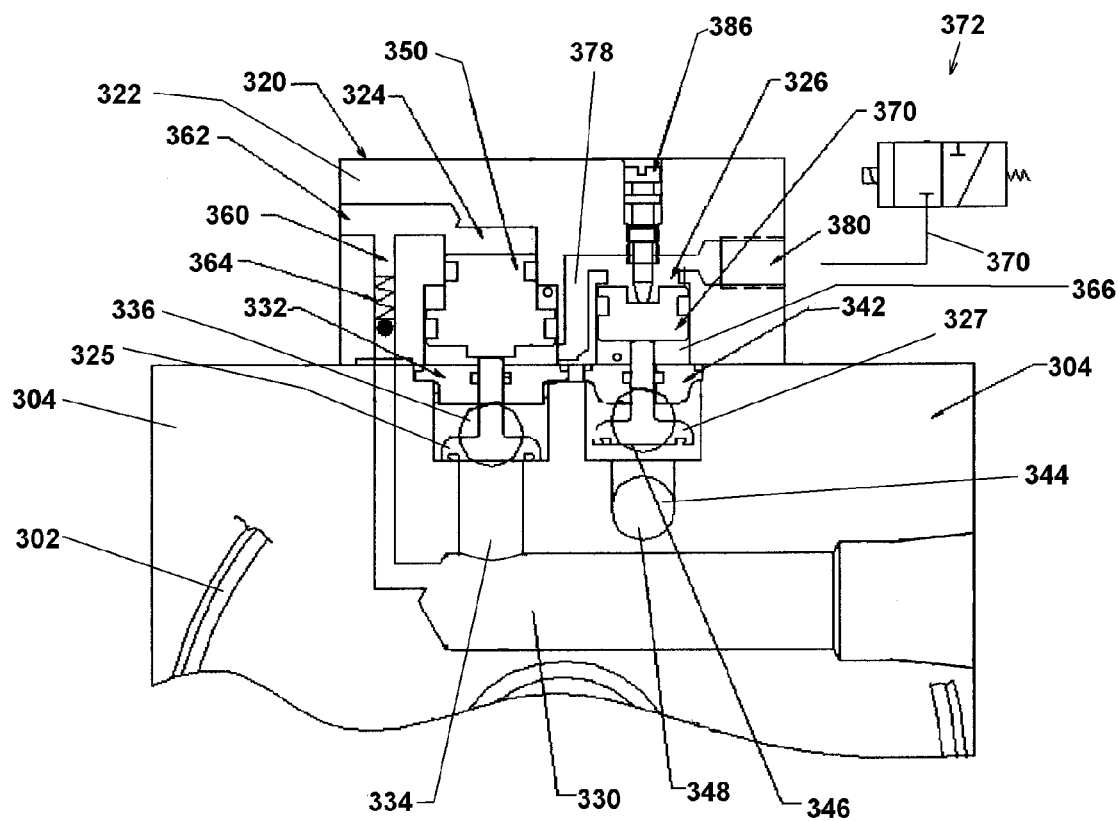
FIG. 18 a cross sectional view of the valve of FIG. 17 showing the valve in the exhaust position.
Figure 19:
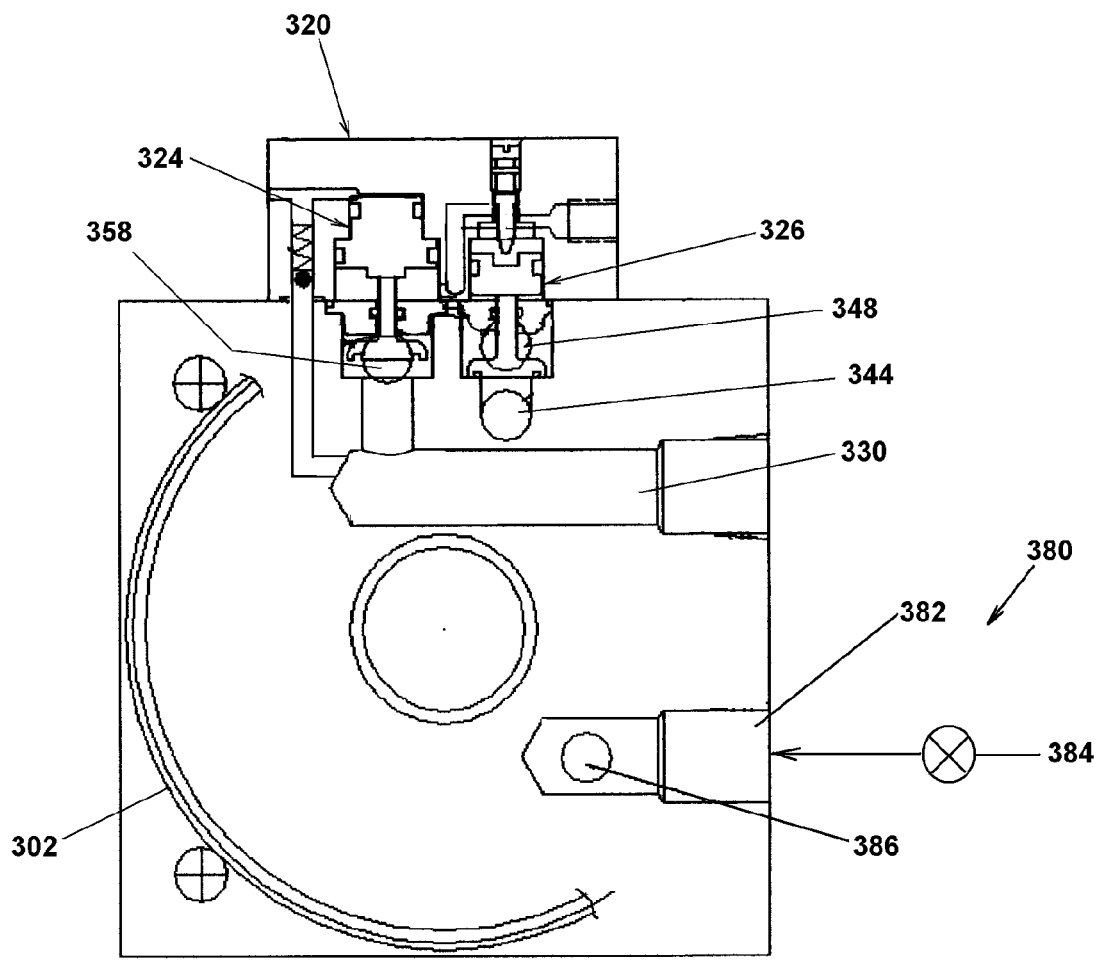
FIG. 19 is a cross sectional view showing the valve of FIG. 17 in the supply position.

An illustrative embodiment for incorporation with a conventional pneumatic cylinder is illustrated in FIGS. 17-19. Therein, a cylinder 300 includes a cylindrical piston sleeve 302 having a rod end plate 304 and a cap end plate 306. A piston 308 is slidably supported in the sleeve 302. A shaft 310 extends through the end plate 304 and is operatively connected with a piston 308 to be actuated thereby. Pressurize fluid is delivered to an extension piston chamber 312 between the piston 308 and the cap end plate 306 to shift the piston 308 and shaft 310 to an extended position. Pressurized fluid is delivered to a retraction piston chamber 314 between the piston 308 and the rod end plate 304 to shift the piston and the shaft to the illustrated retracted position.

A valve 320 for controlling the fluid input and exhaust from an associated chamber is provided at each end plate 304, 306. For description, the valve 320 will be described with respect to the rod end plate 304. Each end plate is a generally rectangular solid of sufficient thickness for accommodating the valve and includes at least one planar surface for incorporation and mounting of the valve. Herein, the end plate forms the valve body and the actuator body 322 is attached thereto by suitable fastening means, such a mounting screws, not shown. The actuator body 322 operatively carries a double piston poppet valve assembly 324 with a poppet valve 325 and a single piston poppet valve assembly 326 with a poppet valve 327.

The end plate 304 includes an inlet port 330 laterally drilled into a side of the end plate and extending beyond and below the valve assemblies. The port has an inlet for connection with a source of pressurized fluid. The valve assembly 324 includes a stepped counter bore coaxial therewith having an outer section locating and supporting a valve guide 332 and base section. The counterbore includes a through hole 334 extending from the base section and intersecting the inlet port 330, and forming a flow orifice having an annular valve seat therearound for sealing with the poppet valve 325. A supply port 336 extends from the rear surface of the plate and intersects the base section for supplying fluid in an open position to the piston chamber.

The valve assembly 326 includes a stepped counterbore coaxial therewith having an outer section supporting a valve guide 342 and a base section. A blind hole 344 extends downwardly from the base of the base section, and forming a flow orifice having an annular seating surface therearound. An exhaust port 346 extends from the rear surface of the plate and intersect the base section of the counterbore. A return port 348 extends from the rear surface of the plate and intersects the hole 344 and serves to return the actuating fluid to source or vent. In the open position, fluid is exhausted from the piston chamber through the exhaust port for flow through the orifice and return or venting through port 348.

The double piston poppet valve assembly includes a double diameter stepped piston 350 slidably supported in a downwardly opening stepped counterbore coaxial with the orifice. The poppet valve 325 includes a stem extending through an opening in the valve guide 332 and connected to the piston 350. The poppet valve 325 includes an enlarged valve head having a sealing element on a lower surface engaging the valve seating surface about the orifice in the closed position to prevent flow from the inlet port 330 to the supply port 336 in the closed position illustrated in FIG. 18 and permit flow therebetween in the open position illustrate in FIG. 18. In assembly, the piston and counterbore establish a small diameter upper chamber above the piston, a larger diameter lower chamber below the piston and between the valve guide, and an intermediate chamber between the piston and the lower section of the counterbore. The upper chamber is continuously pressurized. In one format, the pilot pressure is supplied through a passage 360 between the inlet port and the upper chamber and an exterior port 362 closed or eliminated. The passage may include a check valve 364 for establishing the highest pressure experienced in the inlet port. Alternatively or in combination, pilot pressure may be supplied through the exterior port.

The single piston poppet valve assembly includes a single diameter piston 370 slidably supported in a downwardly opening counterbore coaxial with the orifice. The poppet valve 327 includes a stem extending through an opening in the valve guide 342 and connected to the piston 370. The poppet valve 327 includes an enlarged valve head having a sealing element on a lower surface engaging the valve seating surface about the orifice in the closed position to prevent flow from the exhaust port 348 to the port 346 in the closed position illustrated in FIG. 19 and permit flow therebetween in the open position illustrate in FIG. 18. In assembly, the piston 370 and counterbore establish an upper chamber 326 above the piston, and a lower chamber 366 including a vent below the piston and between the valve guide. The upper chamber 326 of the single piston and the lower chamber of the double piston are fluidly and serially connected to a passage 378 having an outlet 380 at the side of the actuator body and connected by line 370 to a fluid controller 372 such as a solenoid valve. A flow control adjuster 386 as described in a prior embodiment includes a stop member for adjustably controlling the open position of the single piston for adjusting the flow rate is continuously pressurized.

In operation, fluid under pressure is continuously supplied to inlet ports 330 of both cylinder rod end plate 304 and cap end plate 306 and the valves 320 therefor are operated in phase opposition. For retracting, the shaft and cylinder piston, at the extension chamber 314, the double piston valve assembly is shifted to the open position and the single piston valve assembly is shifted to the closed position. Accordingly, on the cap end valve 320 the upper chamber is pressurized at passage 360, and the controller vents the lower passage of the double piston valve assembly and the poppet valve is shifted by the force differential to the closed position, and the fluid flow from port 348 to 346 forces the single piston valve assembly to the open position, thereby exhausting fluid from chamber 312. Concurrently, the other valve on the rod end plate is reversely condition delivering fluid to chamber 314 and moving cylinder piston 308 to the retracted position. For extending, the controller/372 on the rod and cap ends are shifted whereby the valves 320 reverse operation, as described above, and the cylinder is extended.

In both conditions, it will be noted that the fluid delivery paths are compactly located on opposing sides of the poppet valves, thereby significant reducing line losses and providing faster response times. A further increase in response times may be provided by incorporating a booster circuit 380 as shown in FIG. 19. Therein, a lateral booster port 382 is provided in the end plate 304. The port 382 is connected to a fluid source 384. A longitudinal secondary supply port 386 intersects the port 382 and fluidly connects the associated piston chamber with the fluid source. The port 382 includes an associated flow control member 384 that establishes a parallel flow path in concert with the double piston valve to supplement fluid flow to the piston cylinder thereby increasing response time. A similar booster port may be incorporated on the cap end plate.

Figure 20:
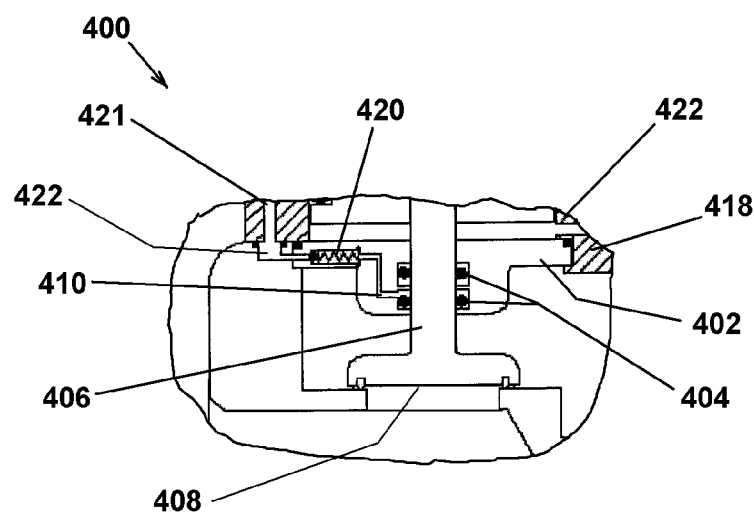
FIG. 20 is a fragmentary cross sectional view of an embodiment of the invention.

For mixed fluid applications using pneumatic actuation for controlling liquids, the above described valves may be provided with a positive barrier for preventing admixture during operation. Referring to FIG. 20, this feature may be provided utilizing the pilot pressure. Therein, the valve 400 includes a valve guide 402 having two axially spaced sealing members 404 engaging the stem 406 of the poppet valve 408. A radial passage 410 is formed in the valve guide 402 having an outlet between the sealing members 404 and an outlet at the outer flange connecting with a passage 422 in the valve body 418 fluidly connected with a pilot pressure passage 421 in the actuator body 418. A check valve 420 is provided in the valve guide operative to admit pilot pressure and block reverse flow of fluid and/or air. Alternatively the check valve may be located at other passage locations intermediate pilot source and the seals.

The above described poppet valve assembly may also be used to provide affirmative flow control in fluid applications using either a double piston or a single piston design. The following embodiments are described with reference to a single piston, however, it will be understood that the features may be obtained with double stepped piston configurations.

Figure 21:
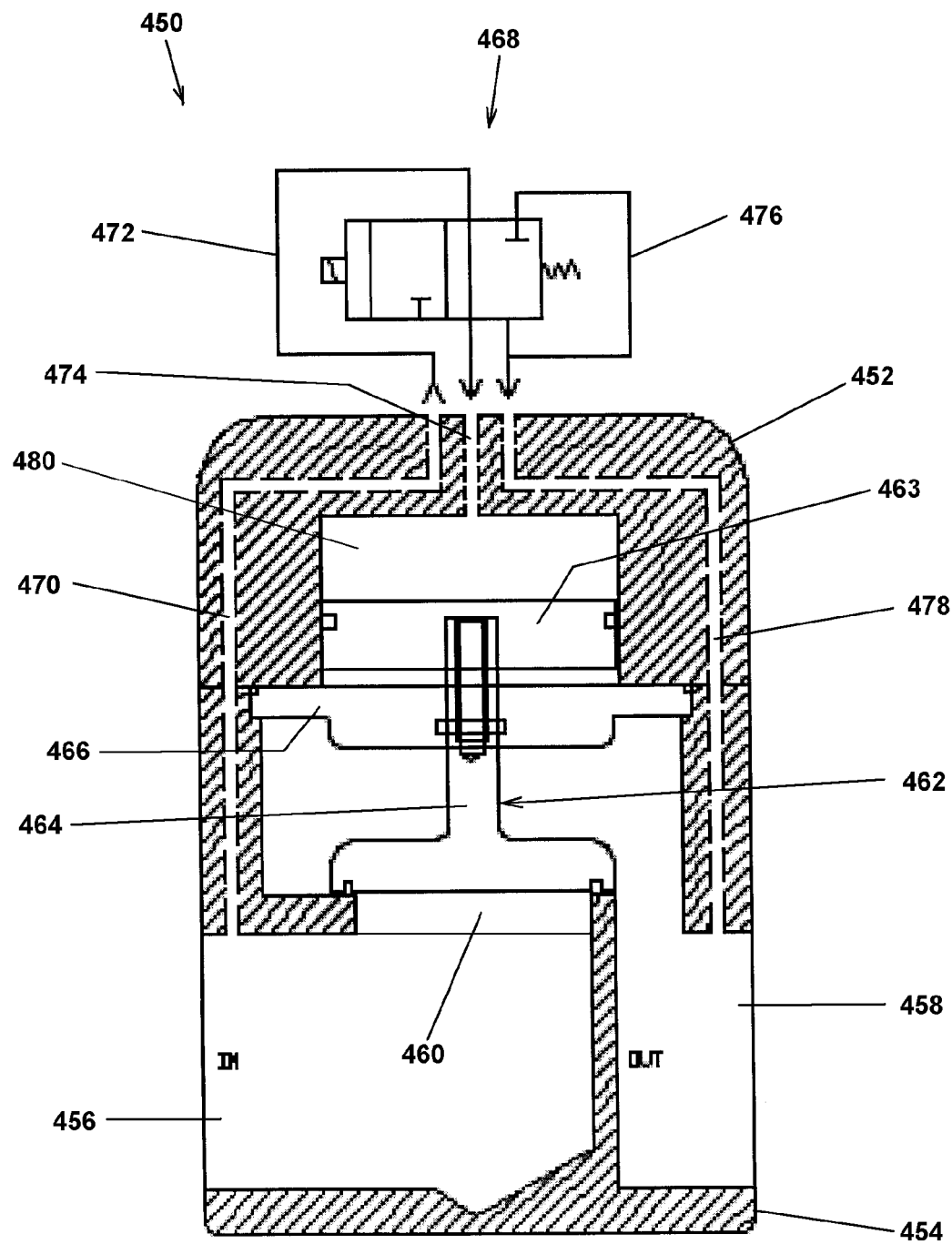
FIG. 21 is a side cross sectional view of another embodiment of the invention showing the valve in the closed position.
Figure 22:
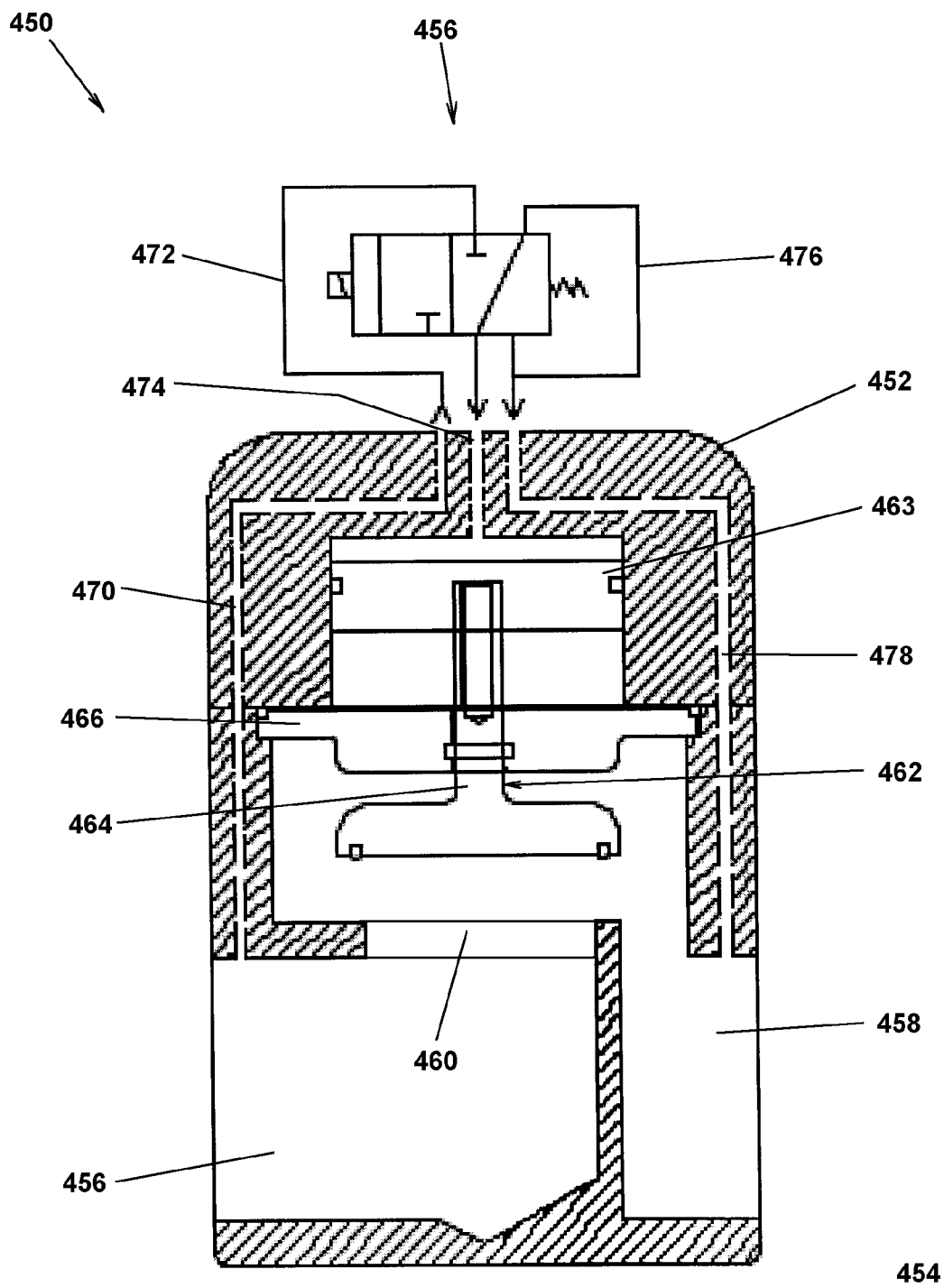
FIG. 22 is a side cross sectional view showing the valve of FIG. 21 in the open position.

Referring to FIGS. 21 and 22, there is shown a flow control valve 450 provided with an anti-back flow capability. The valve 450 includes a two piece housing having an actuator body 452 connected with a valve body 454 by suitable fasteners, not shown. The valve body 454 includes an inlet port 456 aligned with an outlet port 458 fluidly interconnected at a flow orifice 460 therebetween at the base of an upwardly opening counterbore. A single piston poppet valve assembly 462 includes a piston 463 connected with a poppet valve 464 supported by a valve guide 466. The valve assembly 462 is selectively operated by a controller 468, such as a three way solenoid, for movement between the illustrated lowered closed position (FIG. 21), and a raised open position (FIG. 22) whereat fluid flows from the inlet port 456 to the outlet port 458 through the orifice 460. Referring to FIG. 22, the valve is operated by an internal pilot pressure delivered through a passage 470 from the inlet port to the inlet line 472 to a normally closed port at the controller 468. A pilot passage 474 from the upper chamber above the piston is connected with a normally open port of the controller that is connected by line 476 with a passage 478 in the actuator body and valve body having an outlet at the outlet port 458. Referring to FIG. 21, the controller 468 is actuated to deliver pilot pressure through passage 470, the controller and passage 474 to the upper chamber 480 above the piston thereby providing an actuating force moving the poppet valve to the closed position at the sealing interface surrounding the orifice 460 against the static fluid pressure on the poppet valve 464. In the open position, the upper chamber is vented through passage 474, the controller and passage 478 to the outlet port 458. Under flow conditions, as the pressure differential decreases and thereby increasing the outlet port pressure, the outlet pressure is transmitted to the upper chamber. This increase in pressure causes a progressive closing of the poppet valve that is effected before pressure equalization between the ports thereby preventing a reverse flow through the valve.

Figure 23:
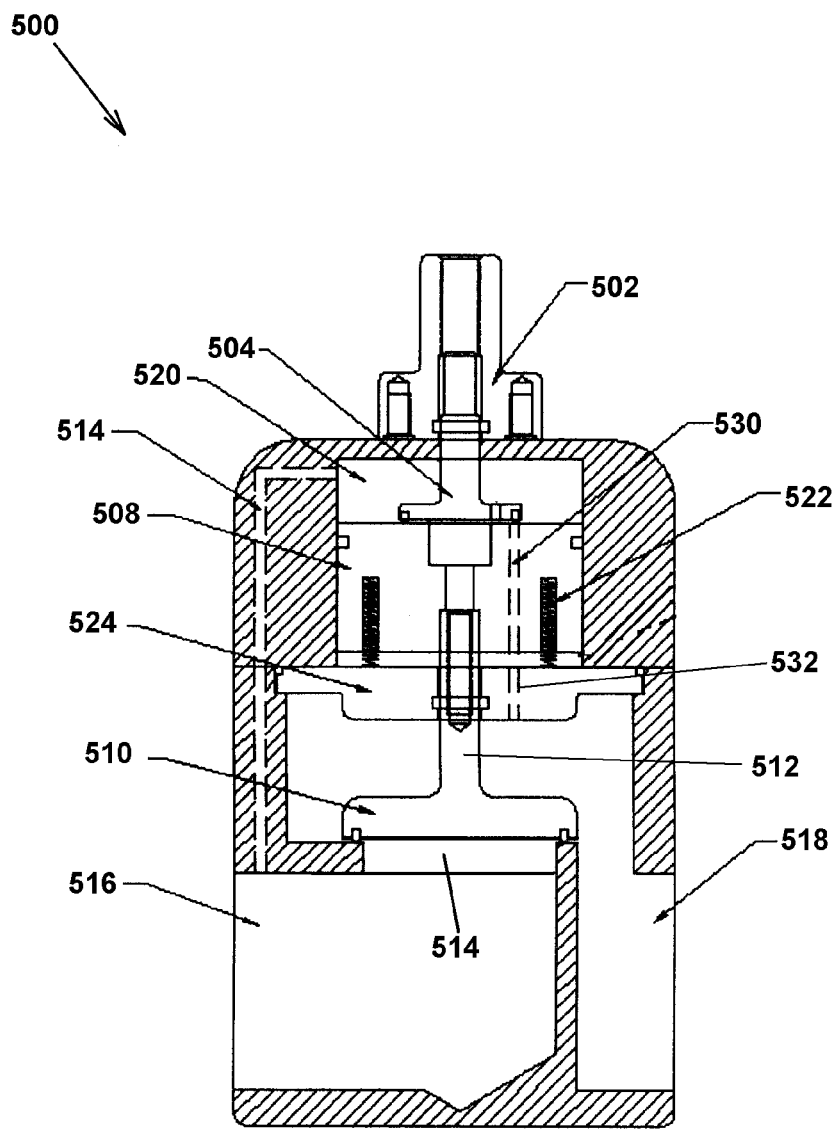
FIG. 23 is a side cross sectional view of another embodiment of the invention.

A single or double piston poppet valve assembly may also be employed to assist operation of a mechanically actuated two way valve with an internal back pressure check. Referring to FIG. 23, a fluid control valve 500 includes an axially adjustable piston stop assembly 502 having an enlarged piston stop 504 that is manually or electromechanically controlled by operator 506 to regulate travel of the piston 508 to control the position of the poppet valve 510 of a poppet valve assembly 512 with respect to a sealing interface around a flow orifice 514 from an inlet port 516 to an outlet port 518 between an open position, intermediate positions, and a closed position. A pilot passage 514 extends from the inlet port 516 to the chamber 520 above the piston 508. Downwardly extending compression spring members 522 are retained between the lower end of the piston and the top end of the valve guide 524 and provide an upward biasing force on the piston 508. The piston 508 and the valve guide 524 include axial through passages 530, 532. The piston stop 504 includes an annular sealing element, such as an O-ring, that engages the top surface of the piston and is effective for sealing the passages 530, 532 in an engaged position.

In the mechanically closed position, the stop 504 engages the piston 508 and pilot pressure is provided through passage 514 to the upper chamber 520, resulting in an affirmative force greater than the static force at the orifice and the biasing force of the spring members 522. As the piston stop is raised, the pilot pressure is bled through the passages 530, 532 resulting in lessened downward force and the spring members bias the piston and the poppet valve upwardly, opening the flow orifice. At the desired piston stop position, the piston reengages the piston stop sealing the passages 530,532 and providing a stable condition. To close the valve, the piston stop is lowered sealing the passages 530,532. During closure, the pressure in the chamber 520 provides the main downward force overcoming the spring and flow forces, thereby significantly reducing the torque needed to move the piston head and providing a flow control that simulates mechanically actuated ball valves. In the desired position, the pressure on both sides of the piston will be equalized and the piston and poppet will float.

Figure 24:
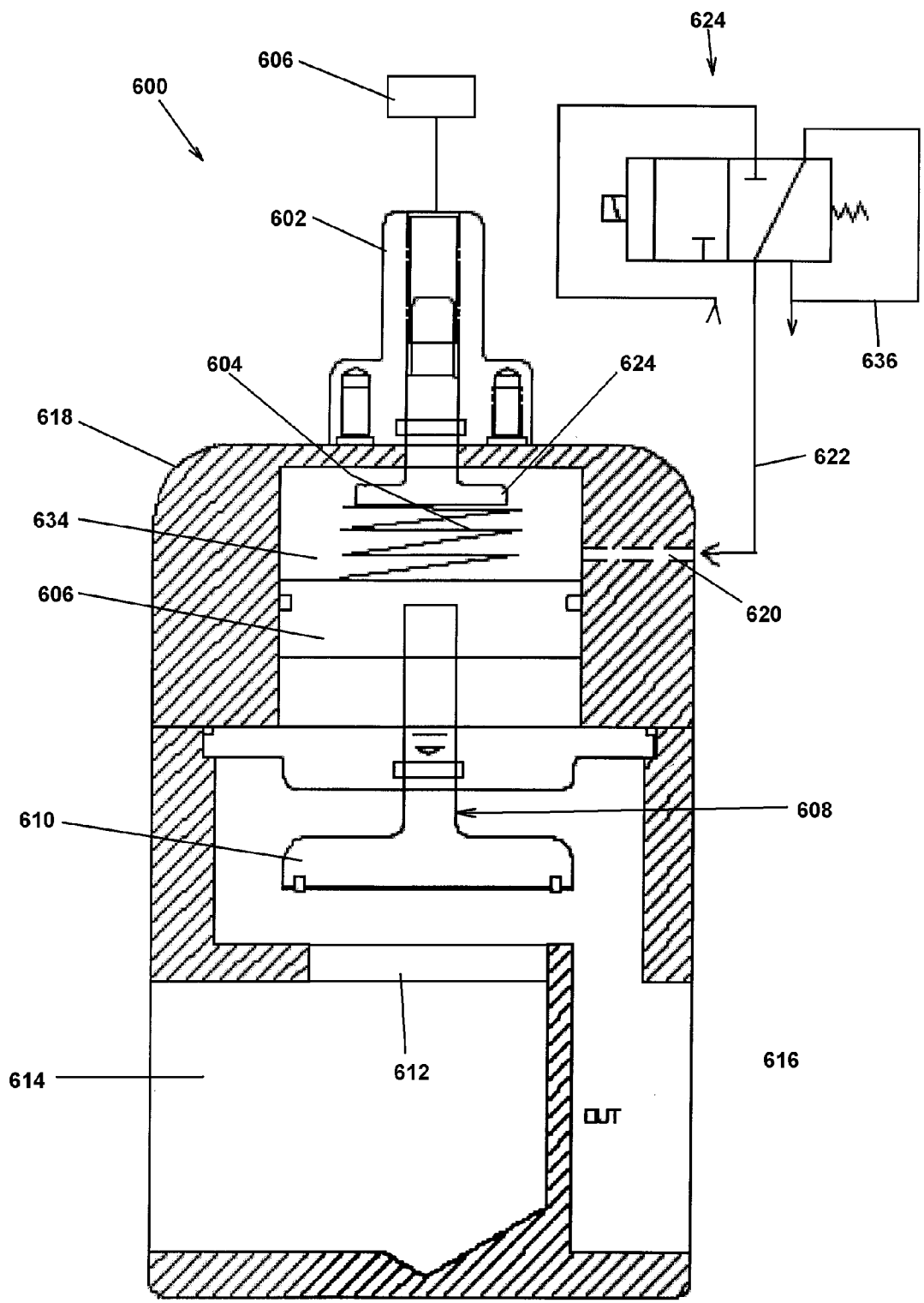
FIG. 24 is a side cross sectional view of another embodiment of the invention.

A single or double piston poppet valve assembly may also be configured to provide pressure reduction and back flow prevention in two way valves. Referring to FIG. 24, a flow control valve 600 includes an adjustable piston stop assembly 602, which in series with a spring member 604 biases the piston 606 of a poppet valve assembly 608 to mechanically move a poppet valve 608 toward a closed position for controlling fluid flow through a flow orifice 612 between an inlet port 614 and an outlet port 616. The actuator body 618 includes a passage 620 connected by line 622 with an outlet port of a controller 624, such as a solenoid valve. When being used as a mechanically actuated pressure reducing valve, the piston stop head 624 is lowered, acting on the spring member 604 and downwardly shifting the poppet valve 610 reducing the flow through the orifice 612 from the inlet port 614 to the outlet port 616. The poppet valve 610 permits fluid flow when the force on the poppet valve is greater than the spring biasing force. As the pressure differential between the ports decreases, the force on the poppet valve decreases and the spring force biases the poppet valve to the closed position. The effect of the pressure differential is adjusted by the position of the piston stop. If the pressure differential reverses, the poppet valve is closed preventing fluid flow in a reverse direction. The controller may be actuated to supply pilot pressure from source 630 through line 622 to the piston chamber 634 to close the valve regardless of the piston stop position. The controller is reversed to vent the chamber and return the pressure regulating and back flow prevention features.

In will thus be appreciated that the present invention provides for double action fluid flow control in a poppet valve assembly wherein additional features may be incorporated to provide operating controls not previously obtainable in such assemblies.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claim.

The invention claimed is:

1. A fluid flow valve comprising:
   a body member having flow ports interconnected by a flow orifice surrounded by an annular planar valve seat normal to an operating axis;
   a stepped piston counterbore in said body member spaced from and coaxial with said valve seat, said piston counterbore having an open end and a closed end;
   a valve guide sealing said open end of piston counterbore and having an opening therethrough coaxial with said operating axis;
   a stepped piston slidably supported in said piston counterbore coaxial with said operating axis, said piston forming a first chamber between said piston and said closed end of said piston counterbore and a second chamber between said piston and said valve guide;
   a poppet valve member having a stem extending through said opening in said valve guide and coaxially operatively connected to said piston for concurrent movement between an open position and a closed position, said poppet valve member having an enlarged head section having a sealing surface normal to said operating axis for engaging said valve seat in said closed position at a sealing interface;
   a stop member in said first chamber axially adjustable to limit movement of said piston, thereby controlling the flow between said ports in said open position, wherein the stop member is directly engageable with the piston to contact the piston; and
   a spring member retained between the stepped piston and the valve guide to provide an upward biasing force on the stepped piston.

2. The fluid flow valve as recited in claim 1 wherein an external pressure source maintains said pressurizing of said first chamber.

3. The fluid flow valve as recited in claim 2 wherein said external pressure source directly is connected with said first chamber.

4. The fluid flow valve as recited in claim 2 wherein an internal pressure pressurizes said first chamber and is communicated from a passage in said body member between at least one of said ports and said first chamber.

5. The fluid flow valve as recited in claim 2 wherein an internal pressure pressurizes said first chamber and is communicated from passages in said body member between both of said ports, and said passages include check valves whereby the highest pressure in the ports is communicated to said first chamber.

6. The fluid flow valve as recited in claim 2 wherein said valve is adapted to be operatively couple with supplemental valve of like construction, wherein said one of said ports is commonly aligned, and wherein said valves are adapted to be supplied with a common source of pressure for said first chamber.

7. The fluid flow valve as recited in claim 1 including a controller for concurrently selectively pressurizing and depressurizing said second chamber of first piston while maintaining pressurizing of said first chamber and for depressurizing said first chamber of said second chamber thereby moving said pistons and associated poppet valves in phase opposition between said open positions and said closed positions and a feature fluidly between said controller and said second chamber for adjustably controlling pressurizing and depressurizing of said second chamber.

8. The fluid flow valve as recited in claim 7 wherein said feature for adjustably controlling includes an adjustable valve member in a passage in said body member between said controller and said second chamber.

9. The fluid flow valve as recited in claim 1 including a pressure regulator operatively associated with said controller for adjustably controlling pressurizing of said second chamber.

10. The fluid flow valve as recited in claim 9 wherein said pressure regulator provides a pressure in said second chamber less than said first chamber, whereby fluid flow forces between said ports modulate a poppet valve position to control fluid flow therebetween.

11. The fluid flow valve as recited in claim 1 wherein said ports are axially aligned.

12. The fluid flow valve as recited in claim 1 wherein one of said ports extends through said body member, and the other of said ports is transverse to said one of said ports.

13. The fluid flow valve as recited in claim 1 including first and second sealing members carried by said valve guide and engaging said valve stem, and a passage in said valve guide for applying pressure between said sealing members for resisting fluid leakage from said ports to said second chamber.

14. The fluid flow valve as recited in claim 13 wherein said passage is fluidly connected with said first chamber.

15. The flow fluid valve as recited in claim 1 including a controller for selectively pressurizing and depressurizing said second chamber while maintaining pressurizing of said first chamber thereby moving said piston and said poppet valve between said open position and said closed position.

16. The flow fluid valve as recited in claim 1 wherein the flow ports are coaxial.

17. The flow fluid valve as recited in claim 1 wherein the poppet valve member includes a planar circular lower surface normal to an axis of the stem of the poppet valve member that can contact the valve seat.

18. The flow fluid valve as recited in claim 1 wherein the stop member is received in a passage.

19. the fluid flow valve as recited in claim 1 wherein the spring member is retained between a lower end of the stepped piston and an upper end of the valve guide.

20. the fluid flow valve as recited in claim 1 wherein the spring member is a compression spring.

21. A fluid flow valve comprising:
   a body member having flow ports interconnected by a flow orifice surrounded by an annular planar valve seat normal to an operating axis;
   a stepped piston counterbore in said body member spaced from and coaxial with said valve seat, said piston counterbore having an open end and a closed end;
   a valve guide sealing said open end of piston counterbore and having an opening therethrough coaxial with said operating axis;
   a stepped piston slidably supported in said piston counterbore coaxial with said operating axis, said piston forming a first chamber between said piston and said closed end of said piston counterbore and a second chamber between said piston and said valve guide;
   a poppet valve member having a stem extending through said opening in said valve guide and coaxially operatively connected to said piston for concurrent movement between an open position and a closed position, said poppet valve member having an enlarged head section having a sealing surface normal to said operating axis for engaging said valve seat in said closed position at a sealing interface; and
   a stop member in said first chamber axially adjustable to limit movement of said piston, thereby controlling the flow between said ports in said open position;

said ports consist of an inlet port between said valve guide and said orifice thereof and a outlet port, an exhaust flow port in said valve body fluidly connected with said outlet port at an exhaust flow orifice surrounded by an annular planar exhaust valve seat normal to an operating axis;

a cylindrical second piston counterbore in said body member spaced from and coaxial with said exhaust valve seat, said second piston counterbore having an open end and a closed end;

a second valve guide sealing said open end of second piston counterbore and having an opening therethrough coaxial with said operating axis;

a cylindrical second piston slidably supported in said second piston counterbore coaxial with said operating axis, said second piston forming a first chamber between said second piston and said closed end of said second piston counterbore and a lower chamber between said second piston and said second valve guide;

a second poppet valve member having a stem extending through said opening in said second valve guide and coaxially operatively connected to said second piston for concurrent movement between an open position and a closed position, said second poppet valve member having an enlarged head section having a sealing surface normal to said operating axis for engaging said exhaust valve seat in said closed position at a sealing interface; and a controller for concurrently selectively pressurizing and depressurizing said second chamber of first piston while maintaining pressurizing of said first chamber and for depressurizing said first chamber of said second chamber thereby moving said pistons and associated poppet valves in phase opposition between said open positions and said closed positions.

22. The fluid flow valve as recited in claim 21 wherein said valve body includes a base member including said ports and orifices and a cover member including said counterbore removably connected to said base member.

23. The fluid flow valve as recited in claim 22 wherein said base member is at each end plate member of a fluidic cylinder having a pair of spaced end plate members, a piston sleeve interconnecting the end plate members and having a piston reciprocably supported a chamber, wherein said piston includes a shaft operatively extending through one of the end plate members, said piston dividing said chamber into a retraction chamber pressurized to retract said shaft into said chamber and an extension chamber pressurized to extend said shaft from said chamber, and said controller is operative with said fluid flow valve in each end plate member to pressurize said chambers in phase opposition to thereby retract and extend said shaft.

24. A fluid flow valve comprising:

a body member having flow ports interconnected by a flow orifice surrounded by an annular planar valve seat normal to an operating axis;

a stepped piston counterbore in said body member spaced from and coaxial with said valve seat, said piston counterbore having an open end and a closed end;

a valve guide sealing said open end of piston counterbore and having an opening therethrough coaxial with said operating axis;

a stepped piston slidably supported in said piston counterbore coaxial with said operating axis, said piston forming a first chamber between said piston and said closed end of said piston counterbore and a second chamber between said piston and said valve guide, wherein the stepped piston has a first portion having a first diameter and a second portion having a second diameter greater than the first diameter, and the stepped piston counterbore has a first portion having a first diameter and a second portion having a second diameter greater than the first diameter, wherein at least a portion of the first portion of the stepped piston is received in the first portion of the stepped piston counterbore and the second portion of the stepped piston is received in the second portion of the stepped piston counterbore;

a poppet valve member having a stem extending through said opening in said valve guide and coaxially operatively connected to said piston for concurrent movement between an open position and a closed position, said poppet valve member having an enlarged head section having a sealing surface normal to said operating axis for engaging said valve seat in said closed position at a sealing interface; and a stop member in said first chamber axially adjustable to limit movement of said piston, thereby controlling the flow between said ports in said open position.

* * * * *